March 28, 1950  W. JOYAL  2,501,774
STANCHION
Filed April 25, 1947

INVENTOR.
WILFRED JOYAL
BY
McMorrow, Berman + Davidson
ATTORNEYS

Patented Mar. 28, 1950

2,501,774

UNITED STATES PATENT OFFICE 2,501,774

STANCHION

Wilfred Joyal, East Montpelier, Vt.

Application April 25, 1947, Serial No. 743,983

2 Claims. (Cl. 119—147)

This invention relates to a stanchion, and more particularly to such a stanchion adapted to be used in barns, stables, or the like, for restraining livestock.

A primary object of the invention is the provision of an improved stanchion characterized by a relatively strong, securely holding latch, adapted to provide strength to the stanchion when in open position, in such manner that an animal entering the same will not disalign or damage the lock or the stanchion.

An additional object of the invention is the provision of such a device which may be readily and simply opened and closed with a minimum of effort or difficulty.

Other objects will in part be obvious and in part be pointed out as the description of the invention proceeds, and shown in the accompanying drawings, wherein there is disclosed a preferred embodiment of this inventive concept.

In the drawings.

Similar reference characters refer to similar parts throughout the several views of the drawings.

Figure 4:
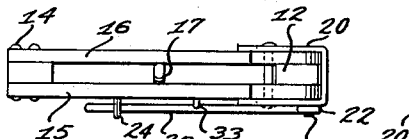
Figure 4 is a top plan view of the device in closed position.
Figure 5:
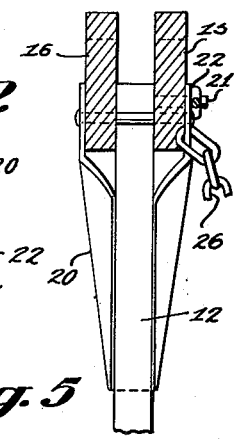
Figure 5 is an enlarged sectional view taken substantially along the line 5—5 of Figure 1, as viewed in the direction indicated by the arrows.

Referring now to the drawings, in detail, the stanchion of the instant invention includes a base member 10, to which is secured a fixed upright 11, and a pivoted upright 12, the latter being mounted on a pivot 13. Secured to the upright 11, as by means of rivets or bolts 14, is a top member, comprised of spaced plates 15 and 16 (see Figure 4), providing a space at their extremities opposite bolt 14, for the accommodation of pivoted upright member 12. A bolt 17 is positioned between the plates 15 and 16, and is adapted for attachment to a chain, in conventional manner, as is a lower eye 18 depending from the base 10.

The stanchion lock of the instant invention comprises a channel-shaped plate 20, having a pin 21 extending therefrom to which is secured an eye 22 comprising a portion of a rod 23, which extends inwardly over the plate 15, passing through a staple 24 adjacent a mid-point thereof. An eye 25 in an extending portion of the channel-shaped member 20 accommodates one end of the chain 26, the opposite end of which is secured to the member 12, to preclude passage thereof past a predetermined point. The channel-shaped member 20 is pivotally secured to the top plates 15 and 16, as at a pivot point 30. It is to be noted that the extremities of each of plates 15 and 16 adjacent the latch member 20 are provided with rounded extremities 31 and notches 32, the purpose of which will be more fully pointed out hereinafter. A stud, which may take the form of a conventional staple, 33, is positioned in the plate 15 adjacent an intermediate point of the rod 23.

Figures 1, 2:
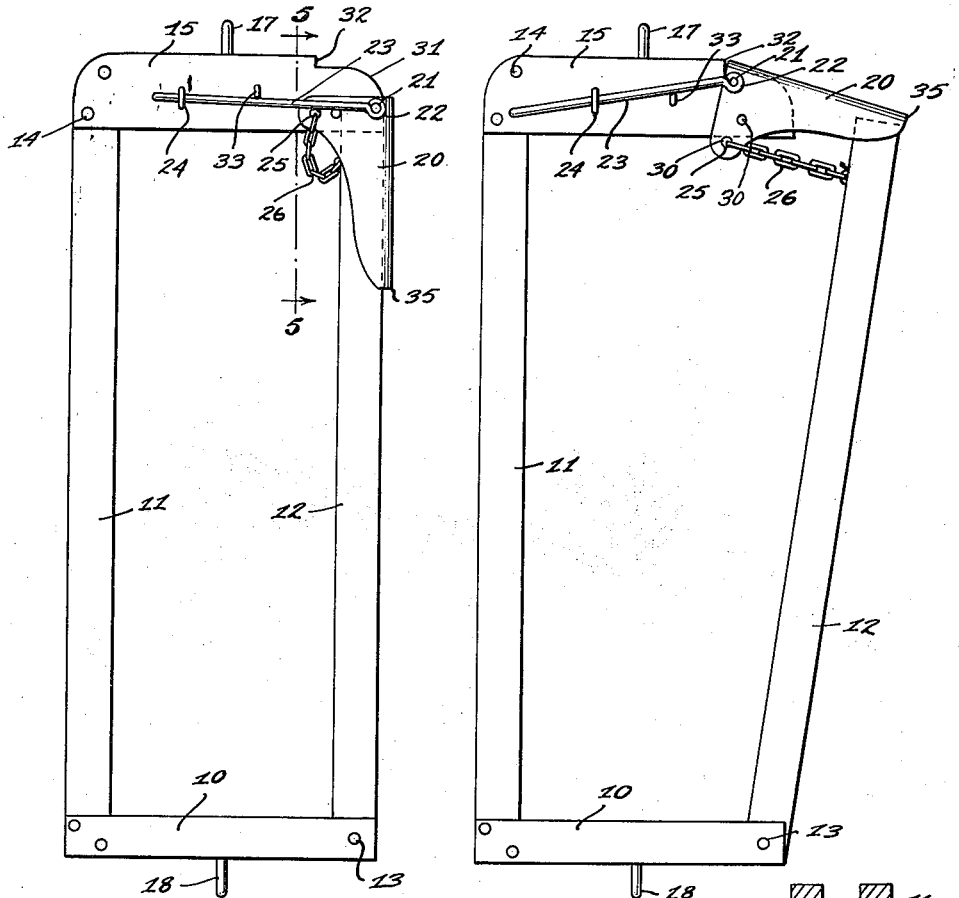
Figure 1 is a front elevational view of the stanchion of the instant invention in closed position.
Figure 2 is a view similar to Figure 1, but showing the stanchion in open position.
Figure 3:
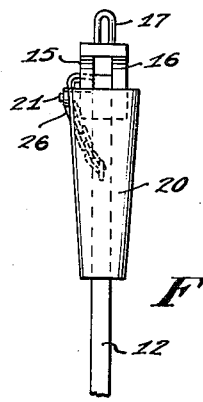
Figure 3 is a fragmentary side elevational view of the device as shown in Figure 1, as viewed from the right.

From the foregoing, the operation of the device should now be readily understandable. With the parts in the position disclosed in Figure 1, the channel-shaped member 20 is pivoted about its pivot point 30, and engages over the side of pivoted upright 12, the rod 23 being positioned below the stud 33, and in substantially friction-tight engagement with the plate 15. When it is desired to open the stanchion, the lower extremity 35 of member 20 is grasped, and the device rotated about the pivot 30 to position disclosed in Figure 2, the stud 33 affording frictional resistance to the passage of the rod 23 thereover. The member 20 rotates about its pivot until such time as the upper extremity thereof engages the notch 32, precluding further rotation, and such abutment, together with the chain 26, precludes the pivotal movement of upright 12 past a predetermined point, sufficient to let an animal enter the stanchion, up to its shoulders. After the animal has entered the stanchion, it will be readily understood that the member 12 may be pivoted to closed position, the extremity thereof passing between the plates 15 and 16, and the channel-shaped member 20 returned to the position shown in Figure 1, the rod 23 passing over the stud 33, thus to be held securely in position until such time as manually released. It is thus seen that the rod 23 which is sufficiently resilient, will flex laterally and pass to the top or bottom of the fixed stud 33, when the member 20 is swung upon its pivot. The rod 23 will detachably hold the member 20 in the open or closed position. If the rod 23 were not employed to hold the member 20 in the lowered or closed position, when the animal quickly threw its head upwardly, the member 20 might swing to the raised position and improperly release the upright member 12.

From the foregoing it will now be seen that there is herein provided an improved stanchion, which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In a stanchion, a base, a fixed upright secured to the base, a fixed top secured to the fixed upright, a movable upright having its lower end pivoted to the base and its upper end to be shifted to open and closed positions with respect to the top, a channel shaped member having a transverse portion to straddle the end of the top and pivotally connected with the top, the channel shaped member being arranged to engage with the movable upright, an apertured element secured to the top, a fixed lug secured to the top and arranged between the apertured element and channel shaped member, a resilient rod slidably mounted in the apertured element, and a pivot connecting the opposite end of the resilient rod and the channel shaped member, the pivot shifting the resilient rod beneath the lug when the channel shaped member is in the closed position and above the fixed lug when the channel shaped member is in the open position.

2. In a stanchion, a base, a fixed upright secured to the base, a fixed top secured to the fixed upright, a movable upright having its lower end pivoted to the base and its upper end to be shifted to opened and closed positions with respect to the top, a channel-shaped member having a transverse portion to straddle the end of the top and pivotally connected with the top, the channel shaped member being arranged to engage the movable upright, an apertured element fixedly secured to the top, a fixed lug secured to the top and arranged between the apertured element and channel shaped member, a resilient rod slidably mounted in the apertured element, a pivot connecting the opposite end of the resilient rod and the channel shaped member and spaced laterally outwardly from the pivot of the channel shaped member, the pivot of the resilient rod shifting the rod beneath the fixed lug when the channel shaped member is in the closed position and above the fixed lug when the channel shaped member is in the open position, and a flexible element attached to the transverse portion of the channel shaped member at a point spaced inwardly and laterally from the pivot of such member and secured to the movable upright near its free end.

WILFRED JOYAL.

REFERENCES CITED

The following references are of record in the file of this patent:

UNITED STATES PATENTS

| Number | Name | Date |
|--------|------|------|
| 650,159 | Wilder | May 22, 1900 |
| 930,069 | George | Aug. 3, 1909 |
| 938,761 | Perry | Feb. 7, 1911 |
| 1,200,231 | Plantiko | Oct. 3, 1916 |